US006476342B1

(12) United States Patent
Gelbart

(10) Patent No.: US 6,476,342 B1
(45) Date of Patent: Nov. 5, 2002

(54) METHOD OF SURFACE PREPARATION USING PLASMA IN AIR

(75) Inventor: Daniel Gelbart, Vancouver (CA)

(73) Assignee: Creo SRL, St. James (BB)

( * ) Notice: Subject to any disclaimer, the term of this patent is extended or adjusted under 35 U.S.C. 154(b) by 0 days.

(21) Appl. No.: 09/722,189

(22) Filed: Nov. 24, 2000

(51) Int. Cl.[7] .......... B23K 10/00

(52) U.S. Cl. .......... 219/121.59; 219/121.41; 219/121.36

(58) Field of Search .......... 219/121.52, 121.59, 219/121.41, 121.4, 121.36; 204/298.21, 298.31; 427/569, 529

(56) References Cited

U.S. PATENT DOCUMENTS 2,587,331 A 2/1952 Jordan
3,376,208 A 4/1968 Wood
3,755,683 A 8/1973 Kiikka et al.
5,041,304 A 8/1991 Kusano et al.
5,239,161 A * 8/1993 Lang .......... 219/121.47
5,314,539 A 5/1994 Brown et al.
5,391,855 A 2/1995 Tanisaki
5,970,993 A * 10/1999 Witherspoon et al. .......... 134/1.1
6,100,496 A * 8/2000 Takuya et al. .......... 219/121.59
6,106,659 A 8/2000 Spence et al.
6,158,648 A * 12/2000 Mari et al. .......... 228/206

* cited by examiner

*Primary Examiner*—Mark Paschall
(74) *Attorney, Agent, or Firm*—Oyen Wiggs Green & Mutala

(57) ABSTRACT

In accordance with the present invention, a directed plasma beam is employed in air to selectively remove coatings from paper products at high production rates. The shape and intensity of the beam is controlled to obtain a controlled rate of removal of the coating. The method does not require vacuum to be established and allows for the plasma to be generated from high pressure air.

19 Claims, 1 Drawing Sheet

METHOD OF SURFACE PREPARATION USING PLASMA IN AIR

FIELD OF THE INVENTION

The invention pertains to the field of surface processing of materials and in particular to the use of plasmas in surface processing of materials

BACKGROUND OF THE INVENTION

The matter of preparing a surface for further processing is an integral step in many industrial processes, and a vast array of methods and techniques exist to address this matter. At one extreme of the spectrum there are sophisticated techniques involving advanced ultra-high vacuum and ion-beam equipment to obtain surfaces that are near to atomically perfect, such as those required in the semiconductor industry. At the other extreme, there are macroscopic abrasive techniques such as sanding, which also have their specifically appropriate fields of application.

In the field of paper products a variety of methods have been employed to address the modification of surfaces by the removal of outer layers, for example, the removal of all or portions of coatings that may have been applied to a substrate. An example of an application in paper products is the bonding of packaging materials that have already been printed. In order to fold and glue the packaging, sections of printed area need to be removed and the surface prepared for good adhesion. In this kind of industrial field abrasion (for example, sanding), chemical treatment, and corona discharge treatment have all found application in one way or another.

Amongst the disadvantages of abrasion is the fact that it is a contact method, exercised by mechanical means. This leads to dust problems and considerable wear and tear on materials, parts and equipment. It is also difficult to control abrasive processes to a degree that allows extremely precise removal of outer surfaces, a feature that may be desirable in applications where it is important not to damage the underlying substrate, or where the application may require the removal in precise patterns or to specific depths. Abrasion is, however, a very direct and low cost method.

Chemical treatment, for its part, tends to be very selective in what it does or does not remove, and its efficacy will depend on the ability of the treatment to interact with the particular materials and surfaces involved. If the treatment involves the wet application of chemicals, there may be wetting problems associated with the process: for instance, when the particular treatment inadequately wets the materials to be removed, or else is absorbed by the underlying substrate, causing unwanted chemical changes or physical deformations (e.g., cockling in the case of paper products). Adsorption of chemical treatments may also leave unwanted residues. Chemical treatment also has associated chemical control and safety considerations, often governed by stringent regulations requiring special control mechanisms.

Corona treatment, while a very elegant physical technique, cannot remove materials to the degree required in many industrial applications and certainly is, for example, not capable of stripping sections of packaging materials prior to automated industrial glue bonding. The same holds for the wider spectrum of glow discharge techniques.

Various techniques based on light have been applied in this field and, while contact-less and highly directable, they tend to be expensive and quite selective about the materials that can be removed. Such techniques most often find application in the very highest technology arenas such as surface photo-preparation of semiconductors. In keeping with the specific requirements of these fields, they are then also often implemented in vacuum. This immediately limits the efficacy of these techniques within a broader base of industry. While high power light sources capable of operating in air at atmospheric pressures are available, they are very expensive.

In the case of surface treatments that can be used on a manufacturing scale, what is required is a non-selective, contact-less technique that does not require a special environment (e.g., a vacuum), and can be used on a wide variety of materials. The method must also be one that can work economically at very high speeds while still being directable in order to obtain maximal control over its application.

BRIEF SUMMARY OF THE INVENTION

In accordance with the present invention, a directed plasma beam is employed in air to selectively remove coatings from paper products at high production rates. The shape and intensity of the beam is controlled to obtain a controlled rate of removal of the coating. The method does not require vacuum to be established and allows for the plasma to be generated from high pressure air.

DETAILED DESCRIPTION OF THE PREFERRED EMBODIMENT

Figure 1:
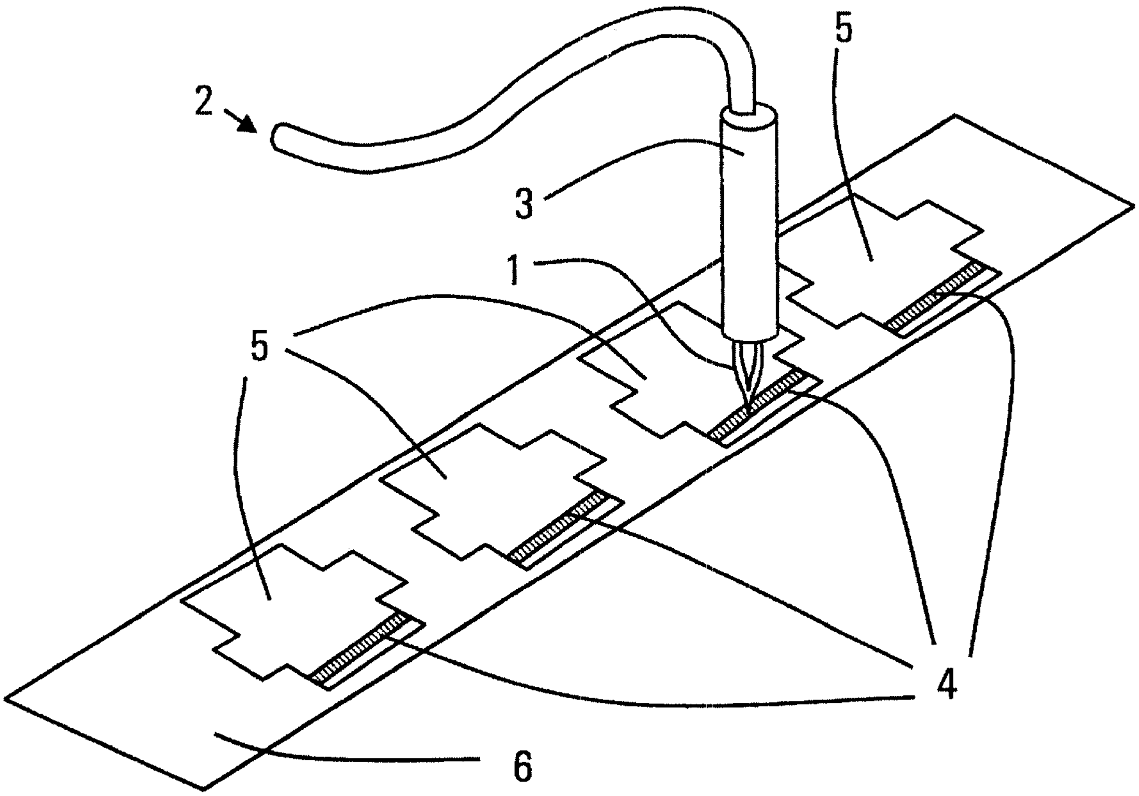
FIG. 1 shows a directed plasma beam employed to selectively remove coatings on a paper-based surface moving at high speed.

FIG. 1 Illustrates the essence of the preferred embodiment of the invention. A plasma beam 1 is generated from a supply of pressurized air 2 by plasma gun 3. Methods, mechanisms and fixtures to create, shape and direct the plasma beam are well known to those skilled in the art and are neither discussed here nor depicted in FIG. 1. Plasma beam 1 is directed to the layer 4 on substrate 5 while substrate 5 moves under the plasma beam 1 at high speed. In the packaging industry, these speeds may vary from 1 meter per second to 10 meters per second and more. Under the action of plasma beam 1, layer 4 is removed from substrate 5.

The term "plasma" is to be understood herein to include all ionization products of an electrical or electromagnetic discharge in any gas or mixture of gases. In this description, the term "plasma beam" is understood to be a beam consisting of such ionization products. To the extent that the intent with this invention is a use of a beam of intensity greater than that achievable by means of the broad group of techniques, known to those skilled in the art as glow discharge, the term "plasma beam" is understood to be a directional beam, unlike glow discharge mechanisms such as corona treatment.

The term "plasma gun", in keeping with the foregoing, is understood to be any source of plasma beams. It is also understood that layer 4 may comprise one single layer, but, in the general case of the preferred embodiment, may comprise more than one constituent layer.

The intent of the invention is to provide a method to remove whatever single layer, or combination of layers, is resident on the surface of the substrate 5. In this respect, the layer or layers may consist of one material or a combination of materials. The invention specifically allows the removal of all of the materials and constituent layers at once.

In order to control the removal of layer 4 from substrate 5, the beam-shape of plasma beam 1 is controlled, as is the beam-intensity of plasma beam 1. Mechanisms to establish this control of beam-shape are well known to those skilled in the art and are not discussed further herewith nor are they depicted in FIG. 1. The beam-intensity of plasma beam 1 may be controlled by controlling the flow of air through the plasma gun 3 and by controlling the power and/or current in the discharge within the plasma gun 3. Neither of these control mechanisms are depicted in FIG. 1 as they are well known to those skilled in the art. The well-defined and highly direction plasma beam 1 allows selective removal of layer 4 from substrate 51 such as strips used for adhesive bonding, at high rates as all of the energy from the discharge within the plasma gun 3 is concentrated on a small area.

Plasma guns can operate on alternating current or direct current and work well with many different gases. Most commonly, however, they employ argon, nitrogen or air. Since air comprises 80% nitrogen, it is a good choice as candidate gas in which to generate the plasma. To the extent that air contains a major percentage of a reactive gas, oxygen, this may be used to great advantage in some cases. In this preferred embodiment, therefore, air is both the discharge medium for the plasma and the environment in which the plasma beam is to be directed. This combination makes for a method that allows the use of a low cost technology to remove a layer or layers of adherent material from a surface in controlled fashion.

Since both the beam-intensity and the speed of the substrate 5 and layer 4 combination may be independently varied, a combination of intensity and speed can be selected for the optimal removal of layers 4 without burning or charring the substrate 5.

By way of example, varnished and metalized cardboard materials, used in the packaging industry to make boxes, were cleaned at rates of over 1 meter per second for a 10 millimeter wide strip, including full removal of the aluminum metalization layer, using a pro-cut 25 plasma cutting unit supplied by the lincoln electric company of cleveland, ohio in the united states.

What is claimed is:

1. A method of removing a layer of material from a substrate, the method comprising:

providing a substrate having a layer on a surface thereof;

providing a plasma gun configured to direct a plasma beam at said layer;

controlling said plasma beam;

moving said substrate relative to said plasma gun; and, removing said layer with said plasma beam to expose said surface, wherein said substrate is not damaged by said plasma beam, and wherein said substrate is one of the following: paper, cardboard, polymeric, natural fiber.

2. A method as in claim 1, wherein said layer is one of or a combination of the following: ink, paint, adhesive, dye, pigment, resin, polymer, oil, powder.

3. A method of removing a layer of material from a paper-based substrate, the method comprising:

providing a paper-based or cardboard-based substrate having a layer on a surface thereof; and directing a plasma beam at the layer and moving the substrate relative to the plasma beam at a rate such that the plasma beam substantially removes the layer in an area of the substrate.

4. The method of claim 3 wherein said layer comprises a plurality of layers.

5. The method of claim 3 comprising moving the substrate in a straight line relative to the plasma beam wherein the area of the substrate comprises a linear strip.

6. The method of claim 5 wherein the linear strip extends substantially parallel to an edge of the substrate.

7. The method of claim 6 comprising applying an adhesive to the linear strip.

8. The method of claim 5 comprising applying an adhesive to the strip.

9. The method of claim 4 wherein each of said plurality of layers comprises at least one of the following: ink, paint, adhesive, dye, pigment, resin, polymer, oil, powder, and aluminum metalization.

10. The method of claim 3 wherein said layer comprises at least one of the following: ink, paint, adhesive, dye, pigment, resin, polymer, oil, powder, and aluminum metalization.

11. A method of preparing a paper-based substrate for adhesive bonding, said method comprising:

providing a paper-based substrate having at least one layer on a surface thereof;

providing plasma beam directed at the at least one layer;

moving the substrate relative to the plasma beam while allowing the plasma beam to remove the layer to expose the surface in a strip; and, applying an adhesive to the strip.

12. A method according to claim 11, wherein the strip is a substantially linear strip.

13. A method according to claim 12, wherein the substantially linear strip extends substantially parallel to an edge of the substrate.

14. A method according to claim 11, wherein the at least one layer comprises at least one of the following: ink, paint, adhesive, dye, pigment, resin, polymer, oil, powder and aluminum metalization.

15. A method of preparing a paper-based substrate for adhesive bonding, the method comprising:

providing a paper-based substrate having a layer on a surface thereof;

directing a plasma beam at the layer and moving the substrate relative to the plasma beam at a rate such that the plasma beam substantially removes the layer from an area of the substrate; and applying adhesive to the area.

16. A method according to claim 15, wherein the layer comprises a plurality of layers.

17. A method according to claim 15 comprising moving the substrate in a straight line relative to the plasma beam, such that the area of the substrate comprises a substantially linear strip.

18. A method according to claim 17, wherein the substantially linear strip extends parallel to an edge of the substrate.

19. A method according to claim 15, wherein the layer comprises at least one of the following: ink, paint, adhesive, dye, pigment, resin, polymer, oil, powder and aluminum metalization.

* * * * *